United States Patent
Harrison

[15] 3,663,387
[45] May 16, 1972

[54] MANUFACTURE OF ELECTRODE FOIL FOR ELECTROLYTIC CAPACITORS

[72] Inventor: Donald Keith Harrison, West Lothian, Scotland

[73] Assignee: Plessey Handel und Investments A.G., Zug, Switzerland

[22] Filed: Mar. 1, 1971

[21] Appl. No.: 122,615

[30] Foreign Application Priority Data

Mar. 5, 1970 Great Britain..................10,536/70

[52] U.S. Cl..............................................204/141, 204/140
[51] Int. Cl. ......................................................C23b 1/00
[58] Field of Search......................204/141, 140; 156/18

[56] References Cited

UNITED STATES PATENTS

| | | | |
|---|---|---|---|
| 2,755,237 | 7/1956 | Turner | 204/141 |
| 2,853,445 | 9/1958 | Catotti | 204/141 |
| 3,297,555 | 1/1967 | Rerat | 204/141 |
| 3,314,867 | 4/1967 | Gore et al. | 204/141 |

FOREIGN PATENTS OR APPLICATIONS 165,625  1/1965  U.S.S.R. ...........................204/141

*Primary Examiner*—John H. Mack
*Assistant Examiner*—T. Tufariello
*Attorney*—Scrivener Parker Scrivener & Clarke

[57] ABSTRACT

Very high gain etching of tantalum foil is achieved by effecting before electrolytic etching with an electrolyte containing lithium chloride, brushing of the surface of the foil with steel wool so as to produce local iron contamination of the tantalum.

7 Claims, 1 Drawing Figure

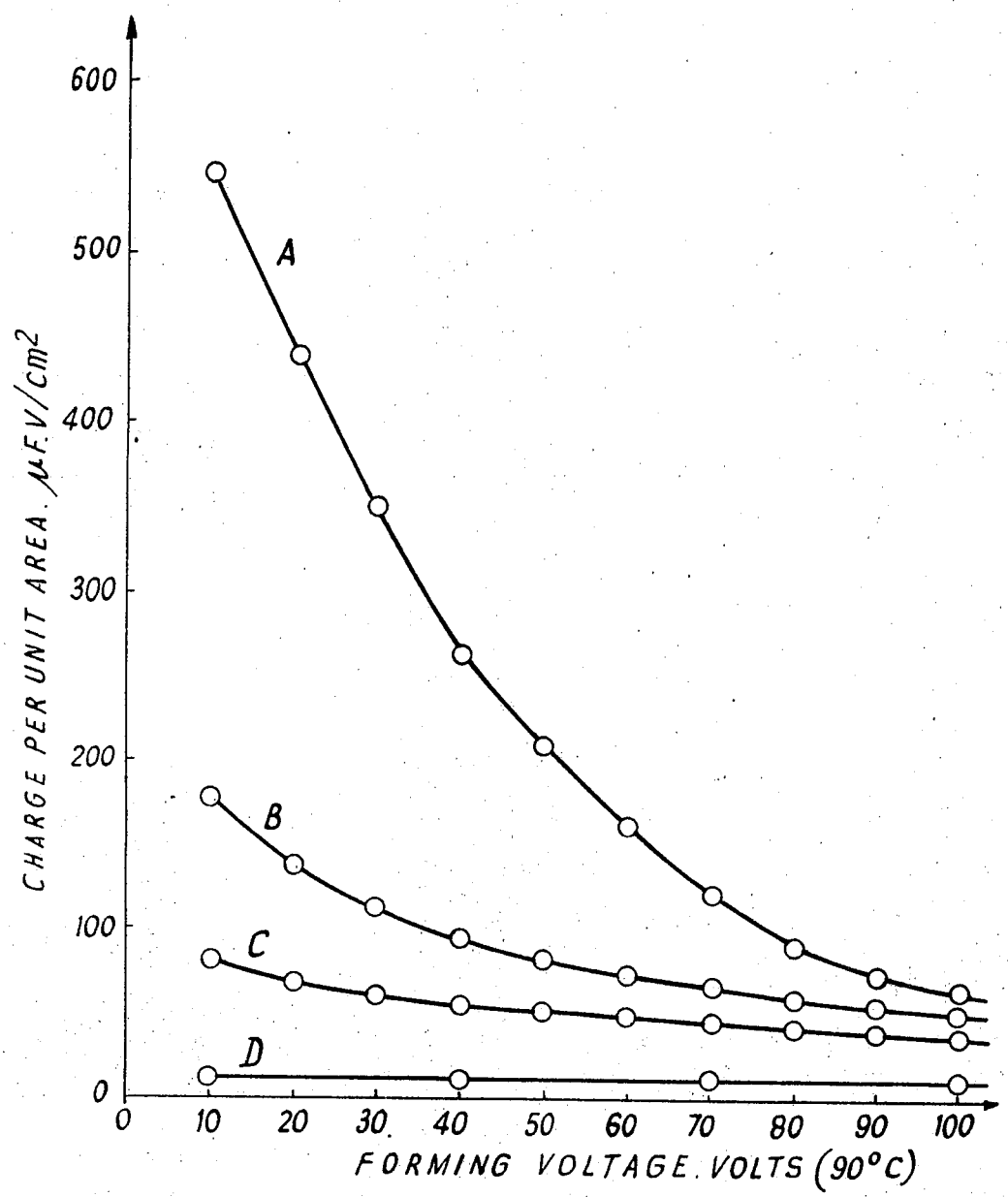

MANUFACTURE OF ELECTRODE FOIL FOR ELECTROLYTIC CAPACITORS

This invention relates to electrolytic capacitors. It has for an object to provide an improved method of increasing the effective electrode surface of a foil of film-forming metal and is particularly, though not perhaps exclusively, applicable to the electrolytic etching of tantalum foil.

In the case of foil of film-forming metal intended to be used as electrode material in electrolytic capacitors, it is known, in order to increase the capacitance obtainable with a given size of foil electrodes, to increase the active surface of the foil by electrolytic etching, and it is a more specific object of the present invention to provide an improved electrolytic etching method capable of achieving a very high gain in capacitance compared with plain, non-etched foil.

According to the present invention the foil is first treated by brushing with metal wood in such a manner as to incorporate in the treated surface particles of the metal as a contamination of the film-forming metal, and electrolytic etching is then performed with the use of an electrolyte containing active halogen ions, the contaminating metal being so selected as to result when, for the purposes of electrolytic etching, a steady etching current is applied, in a reduction of the cell voltage, compared to that occurring in the absence of contamination, at the beginning of the etching operation until the contaminating metal is exhausted, whereafter the cell voltage quickly rises to the usual voltage occurring during the anodic dissolution of the film-forming metal until the cell voltage rises again, indicating the transition from dissolution to oxidation of the film-forming metal. This further rise indicates the progressive predomination of the formation of a barrier layer.

The invention is especially intended for the electrolytic etching of tantalum foil, and in this case the use of fine steel wool, causing the incorporation of contaminating iron particles in the tantalum surface, has been found particularly advantageous, particularly in combination with the use, in the subsequent electrolytic process, of an electrolyte constituted by a solution of lithium chloride in slightly diluted methanol, the preferred composition being an electrolyte in which 20 gms per liter of lithium chloride are dissolved in 82.5 volume percent strength methanol. In order to produce, prior to the etching, the desired degree of iron contamination of the tantalum foil, scratch brushing may be effected at room temperature with file steel wool, with a foil loading of between 2 and 3 lbs per inch of the width, at a steel-wool brush surface speed of approximately 2,700 inches per minute and a foil pull-through speed of about 12 inches per minute. The amount of scratch-brushing required varies, however, greatly with the temperature. Thus, for example, when employing light scratch-brushing which will provide little frictional heating, the desired improvement of the etching process was not achieved even when the tantalum surface was brushed to a matt finish, while much lighter foil loading will ensure sufficient iron pick-up for the etching process to work efficiently if even a small amount of heat is supplied to the scratch-brushing process.

Example: Etchable capacitor-grade tantalum foil of fine grain size and 0.025 mm thick is brushed at room temperature with a rotary 1½-inch diameter brush of fine high-grade steel wool revolving at 900 r.p.m. at a foil loading of between 2 and 3 lbs per inch width with a foil pull-through speed of about 30 cm per minute. After this treatment the foil is subjected to electrolytic etching employing an electrolyte prepared by mixing of 82.5 volume percent of high-purity methanol, such as that obtainable under the registered trademark Analar, with 17.5 volume percent of water and dissolving in this mixture 20 gms of lithium chloride per liter. Anodic etching is then carried out at an operating temperature between 30° and 35° C. with the use of a cathode of stainless steel, at a current density under static etching conditions of 20 mA per sq. cm of foil for a period of about 15 minutes so that each square centimeter of the foil receives altogether approximately 20 coulombs of etching current. During the first few seconds of the etching operation, a steady cell voltage of approximately 4½ to 5 volts is developed. This is believed to correspond to an initial anode reaction involving the anodic dissolution of the iron surface impurities according to the formula $Fe \rightarrow Fe^{2+} \rightarrow Fe^{3+}$. After this the cell voltage quickly rises to a steady 6½ to 7 volts, which is believed to indicate that the anode process becomes one of anodic dissolution of tantalum $Ta \rightarrow Ta^{n+} \rightarrow Ta^{5+}$. During this period the soluble tantalum ion thus removed is eventually precipitated out of solution in the vicinity of the cathode, under alkaline conditions, as tantalum pentoxide.

After a further period of approximately 10 minutes, the cell potential starts to rise again, very slowly at first, indicating that the anode process changes from one of tantalum dissolution to one in which tantalum oxidation, or in other words the formation of a barrier layer, predominates. When the cell potential has risen by a further ½ to 1 volt to reach 7½ to 8 volts, the etching process is virtually completed, and no further surface gain is obtained.

At this stage the electrolytic etching should be discontinued. If it is further continued, the cell voltage will rise further to 9 to 10 volts and then steady-off near that value, and this will be accompanied by a coarse pitting attack liable to perforate the foil rapidly.

After completion of the etching, the foil is quickly washed and the surface of the foil is etched to clean it of any remaining iron impurity by a quick dip, lasting about 10 to 15 seconds, in a solution of concentrated nitric acid and ammonium fluoride, this etching being carried out at room temperature. Then, after washing and drying, the foil is ready to be fabricated and formed into tantalum-capacitor anodes or cathodes. In order to obtain maximum etch gain and minimum increase in brittleness it is desirable to use a foil of as fine a grain as possible.

It may be added that while the indicated composition of the etching solution and the indicated operating temperature are preferred, the etching may be carried out at lower temperatures, but in this case more water is needed and, while the surface gain is greater, this is accompanied by increased embrittlement. On the other hand at higher temperatures the achievable surface gain is lower and less water is required. While the desirable water content of the electrolyte thus varies with the temperature, it has been found that at any one temperature the water content is fairly critical inasmuch as while on the one hand an excess of water is liable to lead to oxidation at too early a stage with the risk of a coarse perforation attack, on the other hand a decrease of the water below the desirable percentage will also lead to the risk of immediate perforation.

The accompanying drawing is a diagram in which the charge per unit area is plotted over the forming voltage, and in which three curves are shown, A representing the charge per unit area obtainable with the foil treated according to the present invention, while B and C respectively indicate the corresponding charges achievable with two previously known etching processes, and line D indicates the charge achievable with unetched plain foil.

It has been found that the etching process according to the present invention is capable of producing in tantalum foil an extremely fine tunnelling-etch structure, somewhat similar to that produced by the chloride ion in the etching of aluminum but almost an order of magnitude finer in size, and that the etch structure is not only quite different from that produced by any of the previously known tantalum-etching techniques but also results in a surface gain which can be many times greater than the best previously obtained. Because of their very fine size, the etching tunnels are however more liable to become completely filled with dielectric as the thickness of the oxide film increases, and for this reason the capacitance gain achievable decreases more rapidly with an increase in the forming voltage than in the case of a low-gain etch. The best results as regards a high surface gain are therefore to be expected for capacitor applications involving a low forming voltage, that is to say in the field of low-voltage capacitors.

In the case of foil formed to a forming voltage of 20 volts it was found that the method according to the aforementioned Example produced a capacitance gain to 44 times the capacitance obtainable with plain tantalum foil. This is in contrast to the results of an ammonium-bromide/methanol/water etch, which produced a capacitance gain to only 6.7 times that of plain tantalum foil, and of a potassium trifluoracetate/methanol/water etch, which achieved a capacitance-gain factor of 13.5.

A number of features of the specific process described in the Example may be varied without departing from the scope of the invention. Thus the use of lithium chloride has been found desirable because of its high solubility in methanol, hydrochloric acid and other soluble chlorides may be alternatively used for the electrolytic tantalum-etching process but although the etch obtained with the use of these materials is similar in other respects, we have not so far succeeded in obtaining with these materials an etch as even as that produced by lithium chloride. Furthermore, while the use of iron as a surface impurity has been found highly successful, the invention does not exclude the use of other impurities to activate the surface of tantalum foil in conjunction with a suitably chosen etching electrolyte, and while the use of stainless steel as the cathode material in the electrolytic etching process was highly satisfactory, the material of the cathode is not critical, and a variety of other materials that will not be unduly attacked, may be used instead.

WHAT WE CLAIM IS:

1. An electrolytic etching process for foil of film-forming material, wherein the foil is first treated by brushing with metal wool in such a manner as to incorporate in the treated surface particles of the metal as a contamination of the film-forming metal, and electrolytic etching is then performed with the use of an electrolyte containing active halogen ions, the contaminating metal being so selected as to result when, for the purposes of electrolytic etching, a steady etching current is applied, in a reduction of the cell voltage, compared to that occurring in the absence of contamination, at the beginning of the etching operation until the contaminating metal is exhausted, whereafter the cell voltage quickly rises to the usual voltage occurring during the anodic dissolution of the film-forming metal until the cell voltage rises again, indicating the transition from dissolution to oxidation of the film-forming metal.

2. An etching process as claimed in claim 1 for the treatment of tantalum foil, wherein the brushing is effected with steel wool.

3. An etching process as claimed in claim 2, wherein the electrolytic etching is carried out with the use of an electrolyte constituted by a solution of lithium chloride in slightly diluted methanol.

4. An etching process as claimed in claim 2, wherein the electrolytic etching is carried out with the use of an electrolyte in which 20 gms per liter of lithium chloride are dissolved in 82.5 volume percent strength methanol.

5. Capacitor foil of film-forming material, whose effective surface has been increased by an electrolytic etching process as claimed in claim 1.

6. Capacitor foil of film-forming material, whose effective surface has been increased by an electrolytic etching process as claimed in claim 4.

7. A tantalum electrolytic capacitor having at least one electrode made of capacitor foil as claimed in claim 5.

* * * * *